March 1, 1949.   W. E. WHITE   2,463,008
BRAKE ACTUATOR
Filed Feb. 10, 1945   2 Sheets-Sheet 1

INVENTOR.
WILLIAM E. WHITE
BY T. J. Plante
ATTORNEY

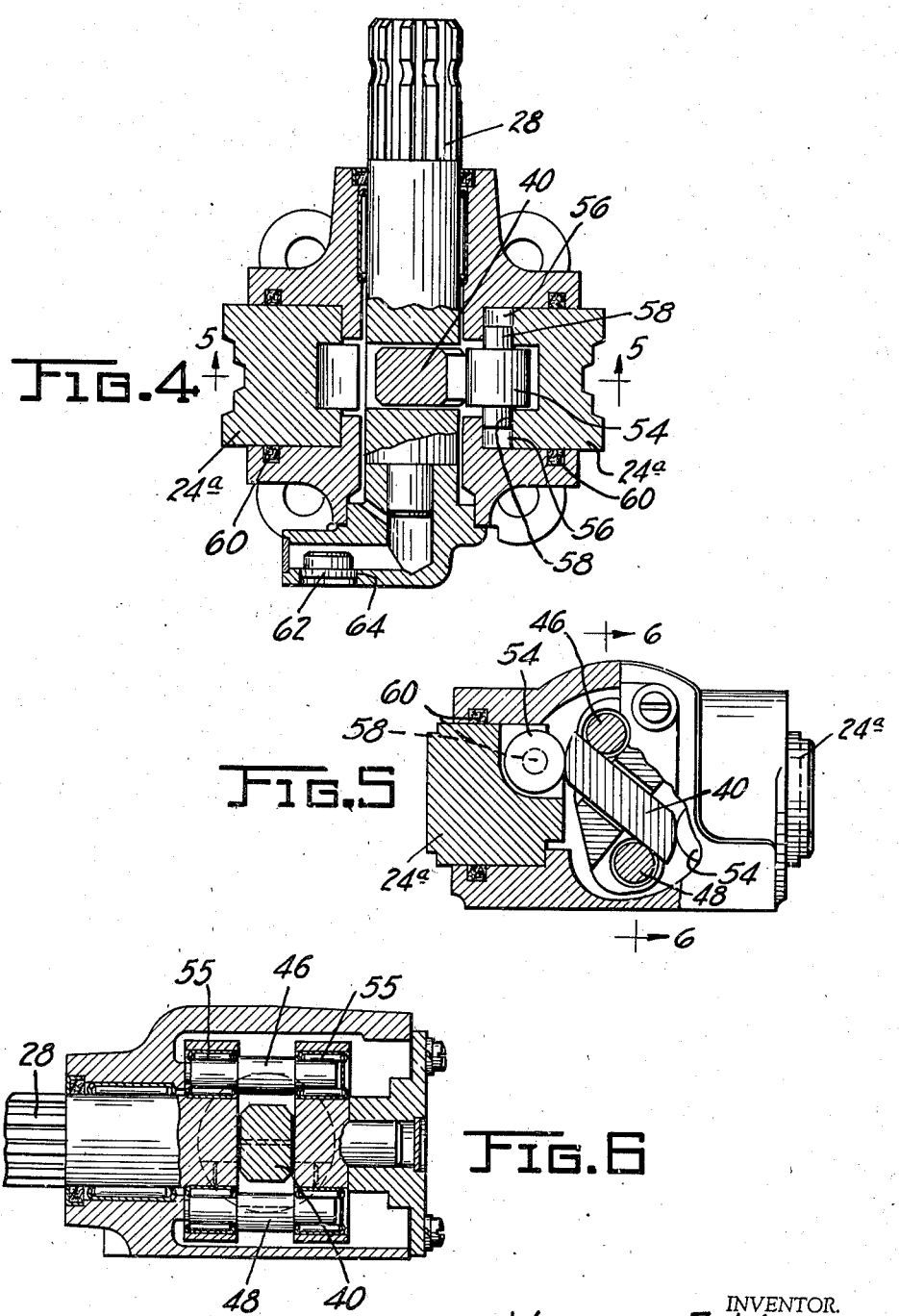

Patented Mar. 1, 1949

2,463,008

UNITED STATES PATENT OFFICE 2,463,008

BRAKE ACTUATOR

William E. White, South Bend, Ind., assignor to Bendix Aviation Corporation, South Bend, Ind., a corporation of Delaware Application February 10, 1945, Serial No. 577,214

8 Claims. (Cl. 188—78)

This invention relates to brake actuating mechanism, and is specifically concerned with that portion of the brake actuating mechanism which spreads the shoes of a drum type brake.

An object of the present invention is to provide an improved mechanical actuator arranged to spread the shoes of a brake, said actuator having a particularly compact and reliable structure.

Another object of the present invention is to provide an improved mechanical actuator which has a relatively low operating friction, and therefore constitutes an especially efficient shoe spreading mechanism.

Yet another object of the present invention is to provide an improved mechanical actuator for brake shoes which is adequately equipped to compensate for variations in the amount of movement of the brake shoe ends when applying pressure is exerted.

Other objects and advantages of the present invention will become apparent during the course of the following description, reference being had therein to the accompanying drawings, in which:

Figure 4 is a section taken through a modified embodiment of my invention;

Figure 5 is a section taken on the line 5—5 of Fig. 4; and

Figure 6 is a section taken on the line 6—6 of Fig. 5.

Figure 1:
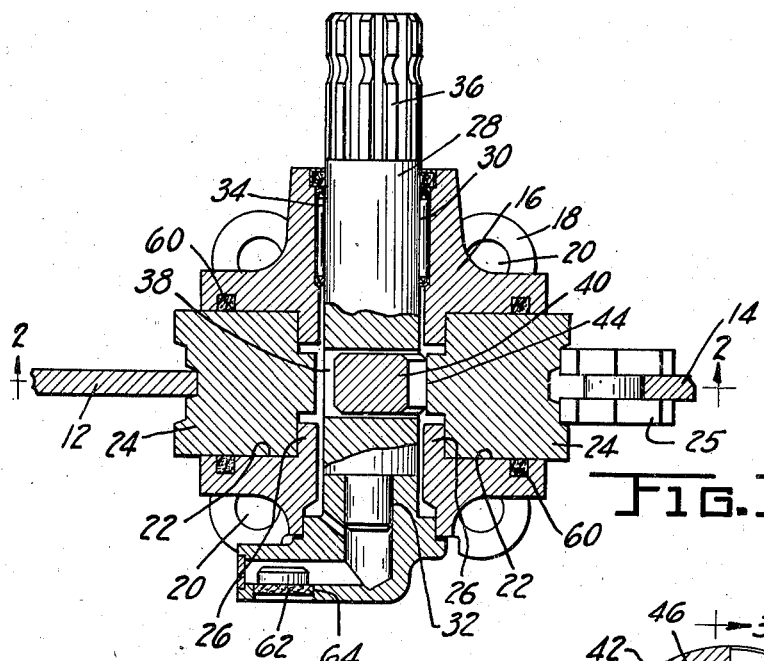
Figure 1 is a cross section showing the general structure of my improved mechanical actuator.
Figure 2:
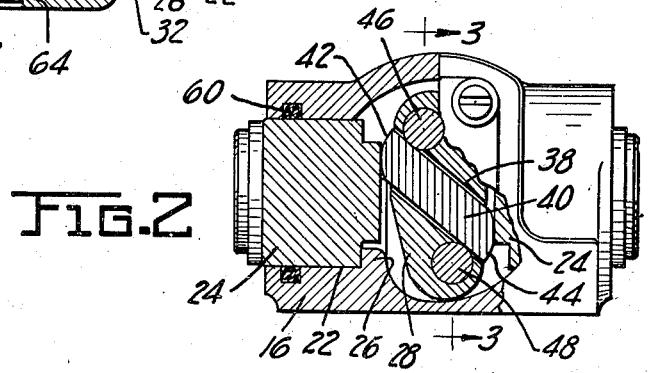
Figure 2 is a section taken on the line 2—2 of Fig. 1.
Figure 3:
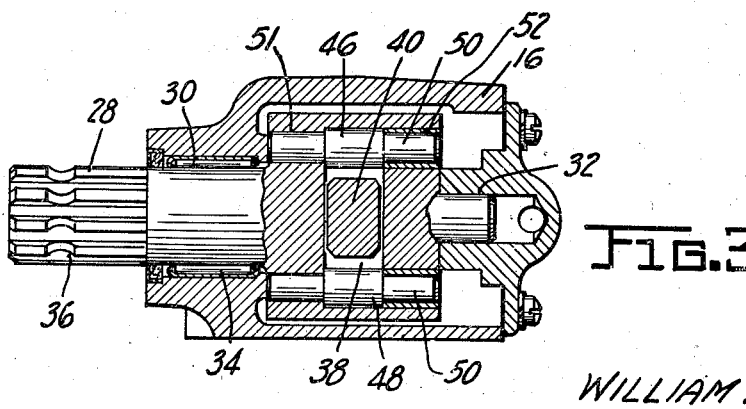
Figure 3 is a section taken on the line 3—3 of Fig. 2.

Referring to Figures 1 to 3 inclusive, actuating means are shown for spreading the ends of shoes 12 and 14. The actuating means may be housed in a casing 16 having a mounting flange 18 secured to a non-rotating member, such as the supporting spider, by any suitable means, as for example bolts, for which a plurality of holes 20 are provided. At opposite sides of the actuator, bores 22 are provided in the casing, in which are reciprocable plungers 24.

The outer ends of the plungers 24 act against the ends of the respective shoes 12 and 14 (in the case of shoe 14, through an adjustor 25), the arrangement being such that outward movement of the plungers moves the shoes into contact with the usual brake drum. In order to limit inward movement of the plungers, annular shoulders 26 are provided in the interior of the casing 16. If the brake structure is such that one or the other of the shoes 12 and 14 will anchor at the end where the actuator is located, the anchoring torque of the particular shoe will be transmitted through the respective plunger 24 and flange 26 to the casing 16 and thence to the supporting spider.

A shaft 28 extends transversely through the center of the actuator and is journaled in the casing at 30 and at 32. Needle bearings 34 are shown at one journal of the shaft, and similar anti-friction mechanism may be provided at the other journal if desired. The outer end of shaft 28 may be splined as shown at 36 to receive the actuating arm, which will be under the control of suitable pressure means, such as a compressed air cylinder, a hydraulic cylinder, or mechanical linkage. The portion of shaft 28 which lies between the two plungers 24 is preferably enlarged to the somewhat elliptical form shown, in order to accommodate the shoe spreading mechanism. An inclined slot 38 is cut through the enlarged center portion of the shaft (see particularly Fig. 2). Extending through the slot 38 is a floating cam or push pin 40 which has one end 42 abutting against one of the plungers 24 and the opposite end 44 abutting against the other plunger.

It will be obvious from the above description that rotation of the shaft 28 in a counterclockwise direction, as viewed in Figure 2, will tend to straighten out the floating cam 40 with respect to the axis of the plungers 24, thereby spreading the plungers and moving the shoes into contact with the brake drum. In order to compensate for variations in the amount of movement of the shoe ends the cam 40 is floating, i. e., it is capable of moving in either direction in the slot 38. If the brake arrangement is such that one of the shoes anchors through its plunger on the respective flange 26, then the cam 40, due to its floating action, will deliver to the moving or unanchored plunger approximately twice the travel available when both plungers move simultaneously. This means that there is no loss of work output despite the fact that one plunger may seat against its anchor due to the load imposed on the plunger by its torque absorbing shoe.

The ends of the floating cam or push pin 40 which contact the plungers are designed to obtain the requisite movement of the plungers. In other words, the ends of member 40 are preferably designed as curves, such as involutes, which cause outward movement of the plungers 24 in addition to the available travel due to the rotation of the cam shaft alone.

Due to the heavy forces developed during application of the brakes, particularly when one of the shoes anchors through the respective flange 26, it is especially important to minimize the friction which opposes proper movement of cam 40. To this end I provide a pair of rollers 46 and 48 supported in the actuating shaft 28 and located at opposite sides of slot 38, preferably near opposite ends of said slot. The reason for the latter preference is that the friction-creating forces acting between cam 40 and the structure which supports it tend to concentrate at approximately the points where the rollers 46 and 48 contact the sides of the cam. The cam is allowed a slight clearance with respect to the slot 38, and the rollers 46 and 48 extend a slight distance into the slot, in order that the cam will bear only against the two rollers.

The rollers 46 and 48 may be constituted by the center portions of relatively small shafts which are mounted in the actuating shaft 28, as illustrated in Figure 3. Each of the shafts, in addition to having its respective center roller portion 46 or 48, has reduced diameter end extensions 50 which are journaled in bearings provided in the actuating shaft 28. One of the end extensions of each roller may be journaled in a reduced opening 51 provided in the body of shaft 28, and the other may be journaled in a bushing 52 pressed in after the respective roller has been inserted. The effect of the roller support for cam 40 is to permit floating movement of the cam with a small amount of friction, and therefore a particularly high mechanical efficiency. Furthermore, the mechanical applying structure as a whole is compact and simple in operation.

The friction in the actuator may be even further reduced, as illustrated in Figures 4 to 6, wherein a pair of rollers 54 are provided to reduce the friction between the ends of cam 40 and the plungers 24a, and wherein the ends of the rollers 46 and 48 are supported in anti-friction needle bearings 55. Each of the plungers is provided with a diametrically extending groove 56, the bottom of which furnishes a bearing for the reduced diameter ends 58 of the rollers 54. In all other respects the arrangement of Figures 4 to 6 is substantially the same as the arrangement of Figures 1 to 3.

In order to lubricate the actuating mechanism properly, it is preferable to provide a bath of some type of lubricating fluid. For this purpose, I provide a plurality of seals 60, as shown in Figure 1, in order to prevent escape of the lubricant. Furthermore, a vent is provided in the actuator casing in order that any air which is drawn into the interior of the casing during the outward movement of the plungers will be permitted to leave during return movement of the plungers, without forcing oil through the seals. Means are provided which will permit air freely to leave the interior of the actuator, while preventing the entrance of particles of dust and other extraneous matter, said means comprising a breather 62 formed of porous material and inserted in an opening 64 in the actuator casing. Preferably the breather 62 is located above the normal level of the lubricating fluid, it being assumed that, in the brake assembly the axis of the plungers 24 will be vertical. The breather should be located above the level of the lubricating fluid, since it is hard to find a material which will permit the passage of air without also allowing seepage of the fluid.

Although particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. An actuator adapted to spread the shoes of a drum brake comprising a casing having two opposed co-axial plungers reciprocable therein, each of which is operatively connected to one of the shoes, a roller located at the inner end of each plunger and having a shaft journaled in a bearing provided by the plunger, said casing being provided with internal shoulders which limit the inward movement of the shoes and which are adapted to anchor the plungers and thereby absorb the anchoring torque of the shoes, an actuating shaft journaled in said casing and extending transversely thereof between said plungers, the portion of said shaft between the plungers being enlarged and having a transverse slot cut therethrough at an angle to the axis of the plungers, two relatively small shafts supported in the aforementioned actuating shaft and located at opposite sides of the slot and near opposite ends thereof, each of said small shafts comprising a center roller portion the periphery of which extends slightly into the slot, and reduced diameter end portions, four sets of needle bearings supported in the actuating shaft and receiving the reduced diameter end portions of the two small shafts, a floating cam extending through the slot with its ends contacting the rollers at the inner ends of the opposed plungers, the sides of said floating cam being spaced slightly from the walls of the slot and bearing only against the roller portions of the respective small shafts, the arrangement being such that rotation of the actuating shaft brings the slot and floating cam more nearly into line with the axis of the plungers, thereby moving said plungers apart, the cam being free to move in the slot as one or the other of the shoes moves to anchor on the respective shoulder of the casing.

2. An actuator adapted to spread the shoes of a drum brake comprising a casing having two opposed co-axial plungers reciprocable therein, each of which is operatively connected to one of the shoes, a roller located at the inner end of each plunger and having a shaft journaled in a bearing provided by the plunger, said casing being provided with internal shoulders which limit the inward movement of the shoes and which are adapted to anchor the plungers and thereby absorb the anchoring torque of the shoes, an actuating shaft journaled in said casing and extending transversely thereof between said plungers, the portion of said shaft between the plungers being enlarged and having a transverse slot cut therethrough at an angle to the axis of the plungers, two relatively small shafts supported in the aforementioned actuating shaft and located at opposite sides of the slot and near opposite ends thereof, each of said small shafts comprising a center roller portion the periphery of which extends slightly into the slot, and reduced diameter end portions journaled in bearings provided in the actuating shaft, a floating cam extending through the slot with its ends contacting the rollers at the inner ends of the opposed plungers, the sides of said floating cam being spaced slightly from the walls of the slot and bearing only against the roller portions of the respective small shafts, the arrangement being such that rotation of the actuating shaft brings the slot and floating cam more nearly into line with the axis of the plungers, thereby moving said plungers apart, the cam being free to move in the slot as one or the other of the shoes moves to anchor on the respective shoulder of the casing.

3. An actuator adapted to spread the shoes of a drum brake comprising a casing having two opposed co-axial plungers reciprocable therein, each of which is operatively connected to one of the shoes, said casing being provided with internal shoulders which limit the inward movement of the shoes and which are adapted to anchor the plungers and thereby absorb the anchoring torque of the shoes, an actuating shaft journaled in said casing and extending transversely thereof between said plungers, the portion of said shaft between the plungers being enlarged and having a slot cut therethrough at an angle to the axis of the plungers, two relatively small shafts supported in the aforementioned actuating shaft and located at opposite sides of the slot and near opposite ends thereof, each of said small shafts comprising a center roller portion the periphery of which extends slightly into the slot, and reduced diameter end portions journaled in bearings provided in the actuating shaft, a floating cam extending through the slot with its ends contacting the opposed plungers, the sides of said floating cam being spaced slightly from the walls of the slot and bearing only against the roller portions of the respective small shafts, the arrangement being such that rotation of the actuating shaft brings the slot and floating cam more nearly into line with the axis of the plungers, thereby moving said plungers apart, the cam being free to move in the slot as one or the other of the shoes moves to anchor on the respective shoulder of the casing.

4. An actuator adapted to spread the shoes of a drum brake comprising a casing having two opposed co-axial plungers reciprocable therein, each of which is operatively connected to one of the shoes, said casing being provided with internal shoulders which limit the inward movement of the shoes, an actuating shaft journaled in said casing and extending transversely thereof between said plungers, the portion of said shaft between the plungers being enlarged and having a slot cut therethrough at an angle to the axis of the plungers, two relatively small shafts supported in the aforementioned actuating shaft with their axes parallel to that of said actuating shaft, said small shafts being located at opposite sides of the slot and near opposite ends thereof, each of said small shafts comprising a center roller portion the periphery of which extends slightly into the slot, and reduced diameter end portions journaled in bearings provided in the actuating shaft, a floating cam extending through the slot with its ends contacting the opposed plungers, the sides of said floating cam being spaced slightly from the walls of the slot and bearing only against the roller portions of the respective small shafts, the arrangement being such that rotation of the actuating shaft brings the slot and floating cam more nearly into line with the axis of the plungers, thereby moving said plungers apart, the cam being free to move in the slot to compensate for variations in the movement of the shoe ends.

5. An actuator adapted to spread the shoes of a drum brake comprising a casing having two opposed plungers reciprocable therein, each of which is operatively connected to one of the shoes and each of which supports a roller at its inner end, said casing being provided with internal shoulders which limit the inward movement of the shoes, an actuating shaft journaled in said casing and extending transversely thereof between said plungers, the portion of said shaft between the plungers having a slot cut therethrough, two relatively small shafts supported in the aforementioned actuating shaft and located at opposite sides of the slot and near opposite ends thereof, each of said small shafts comprising a center roller portion the periphery of which extends slightly into the slot and journal end portions, anti-friction bearings supported in the actuating shaft and receiving the journal end portions of the two small shafts, a floating cam extending through the slot with its ends contacting the rollers at the inner ends of the opposed plungers, the sides of said floating cam being spaced slightly from the walls of the slot and bearing only against the roller portions of the respective small shafts, the arrangement being such that rotation of the actuating shaft causes the floating cam to move said plungers apart, the cam being free to move in the slot to compensate for variations in the movement of the shoe ends.

6. An actuator adapted to spread the shoes of a drum brake comprising a casing having two opposed plungers reciprocable therein, each of which is operatively connected to one of the shoes, said casing being provided with internal shoulders which limit the inward movement of the shoes, an actuating shaft journaled in said casing and extending transversely thereof between said plungers, the portion of said shaft between the plungers being enlarged and having a slot cut therethrough, two relatively small shafts supported in the aforementioned actuating shaft with their axes substantially parallel to that of said actuating shaft, said small shafts being located at opposite sides of the slot and near opposite ends thereof, each of said small shafts comprising a center roller portion the periphery of which extends slightly into the slot, and reduced diameter end portions journaled in bearings provided in the actuating shaft, a floating cam extending through the slot with its ends contacting the opposed plungers, the sides of said floating cam being spaced slightly from the walls of the slot and bearing only against the roller portions of the respective small shafts, the arrangement being such that rotation of the shaft causes the floating cam to move said plungers apart, the cam being free to move in the slot to compensate for variations in the movement of the shoe ends.

7. An actuator adapted to spread the shoes of a drum brake comprising a casing having two opposed plungers reciprocable therein, each of which is operatively connected to one of the shoes, said casing being provided with internal shoulders which limit the inward movement of the shoes, an actuating shaft journaled in said casing and extending transversely thereof between said plungers, the portion of said shaft between the plungers having a slot cut therethrough, two relatively small shafts supported in the aforementioned actuating shaft and located at opposite sides of the slot and near opposite ends thereof, each of said small shafts comprising a center roller portion the periphery of which extends slightly into the slot, and journal end portions supported in bearings provided in the actuating shaft, a floating cam extending through the slot with its ends contacting the opposed plungers, the sides of said floating cam being spaced slightly from the walls of the slot and bearing only against the roller portions of the respective small shafts, the arrangement being such that rotation of the shaft causes the floating cam to move said plungers apart, the cam being free to move in the slot to compensate for variations in the movement of the shoe ends.

8. An actuator adapted to spread the shoes of a drum brake comprising a casing having two opposed plungers reciprocable therein, each of which is operatively connected to one of the shoes, an actuating shaft journaled in said casing and extending transversely thereof between said plungers, the portion of said shaft between the plungers having a slot cut therethrough, two relatively small shafts journaled in the aforementioned actuating shaft and located at opposite sides of the slot, each of said small shafts having a roller portion the periphery of which extends slightly into the slot, a floating cam extending through the slot with its ends operatively connected to the opposed plungers, the sides of said floating cam being spaced slightly from the walls of the slot and bearing only against the roller portions of the respective small shafts, the arrangement being such that rotation of the shaft causes the floating cam to move said plungers apart, the cam being free to move in the slot to compensate for variations in the movement of the shoe ends.

WILLIAM E. WHITE.

REFERENCES CITED

The following references are of record in the file of this patent:

UNITED STATES PATENTS

| Number | Name | Date |
| --- | --- | --- |
| 1,453,050 | Link | Apr. 24, 1923 |
| 1,771,832 | Andres | July 29, 1930 |
| 1,980,512 | White | Nov. 13, 1934 |